Sept. 5, 1967   R. L. JOHNSTON   3,340,397
MULTIPLE ENVIRONMENT MATERIALS TEST CHAMBER HAVING
A MULTIPLE PORT X-RAY TUBE FOR IRRADIATING
A PLURALITY OF SAMPLES
Filed Dec. 9, 1964   4 Sheets-Sheet 1
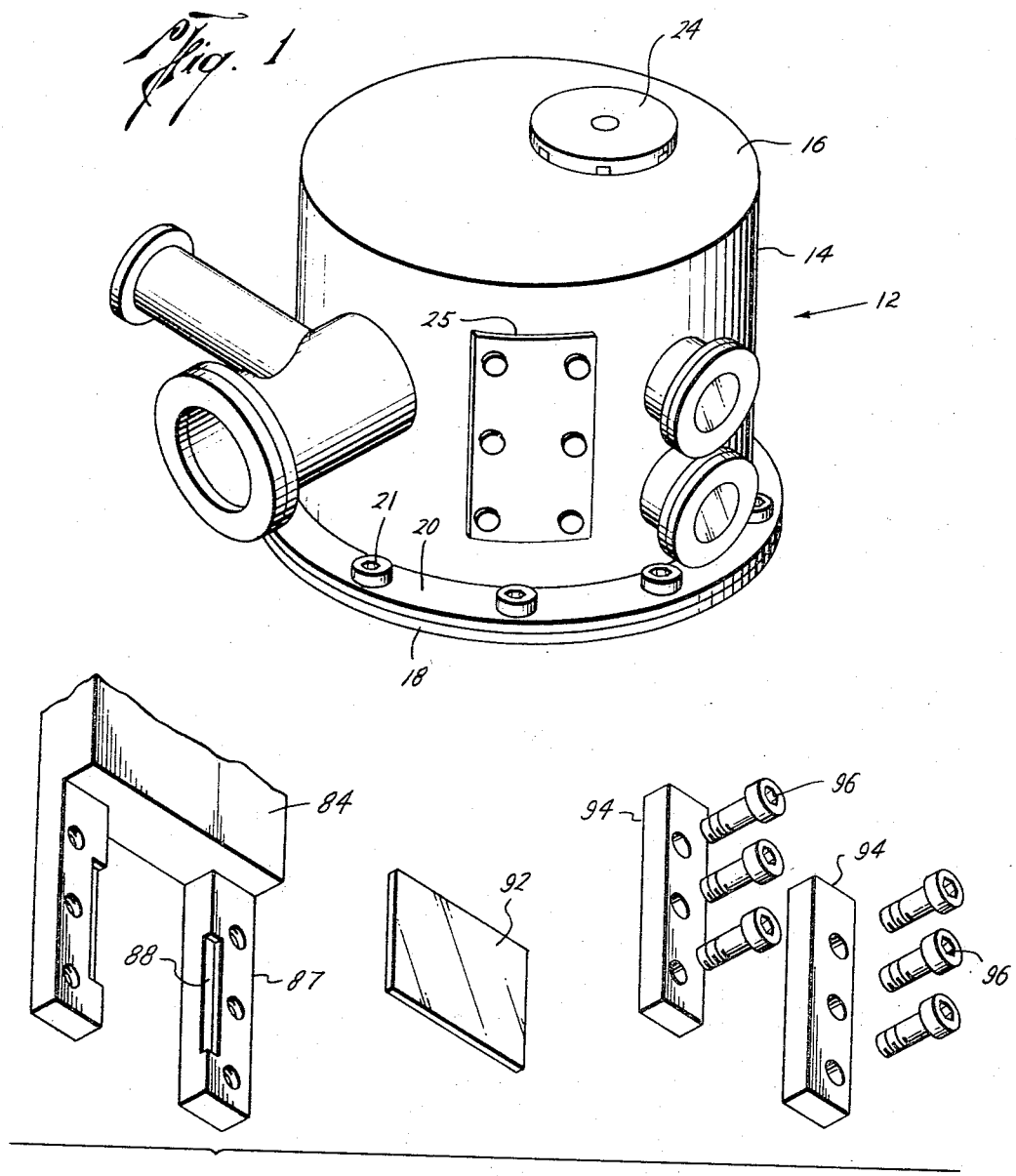
Robert L. Johnston
INVENTOR.
BY
ATTORNEYS

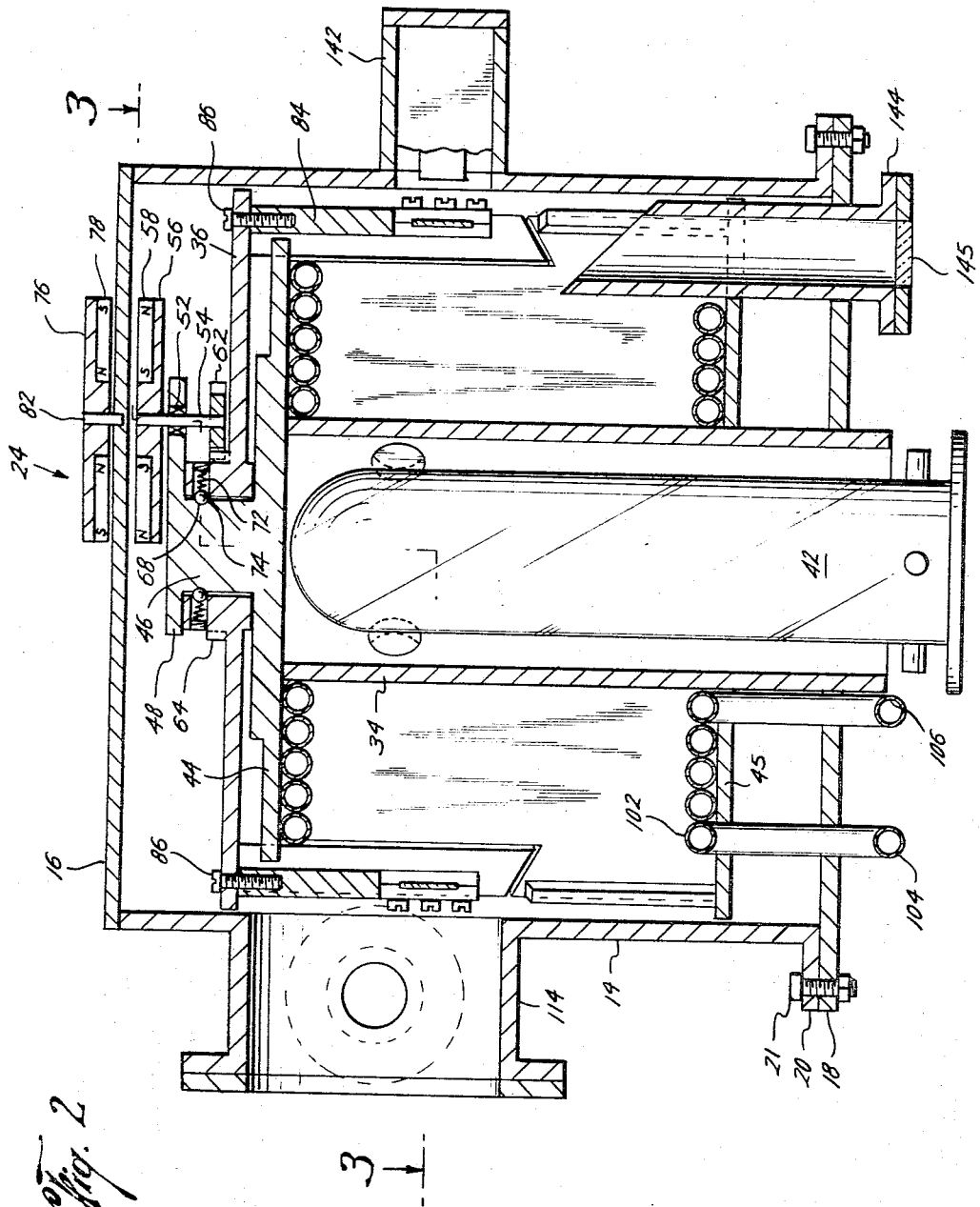

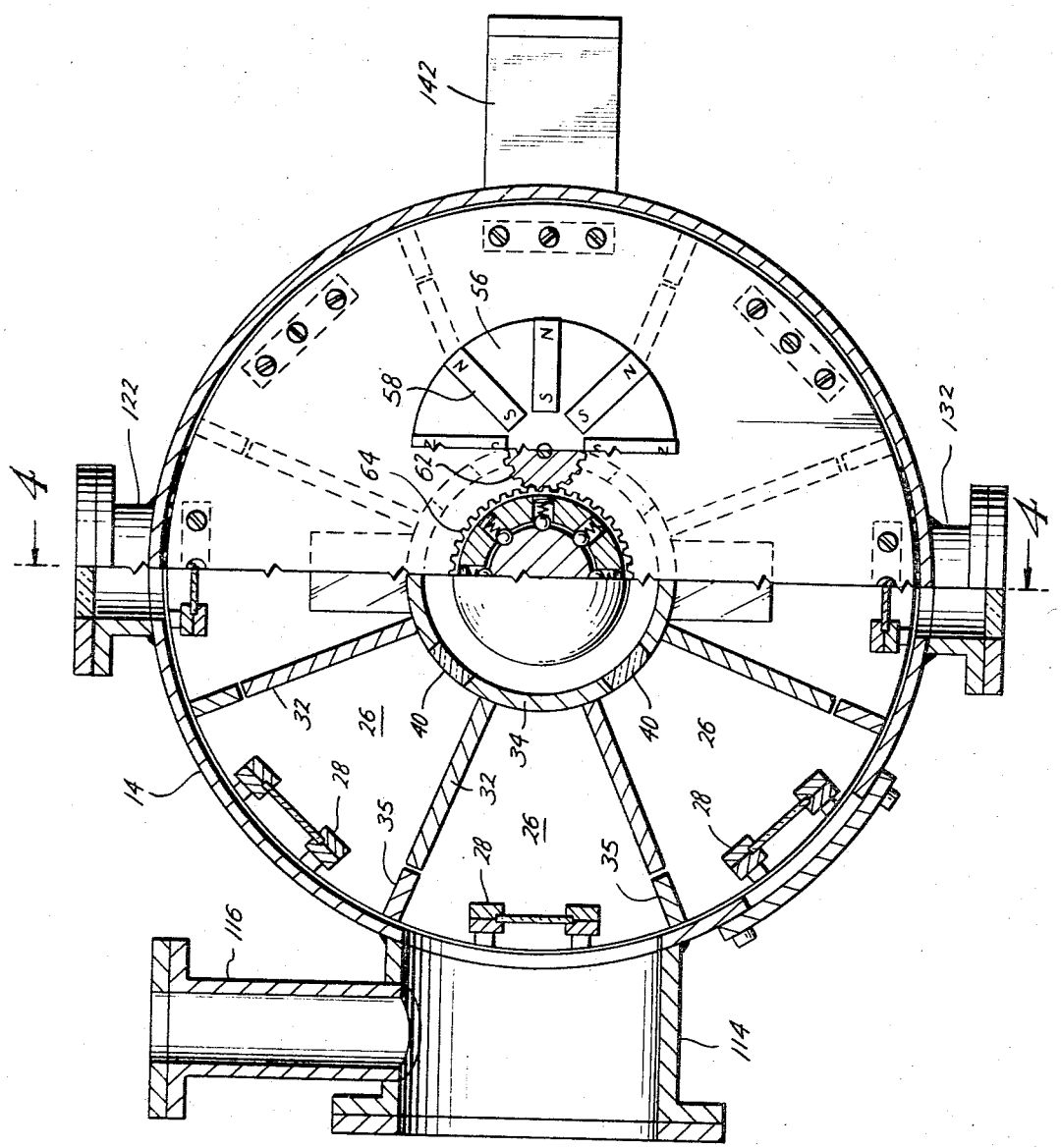

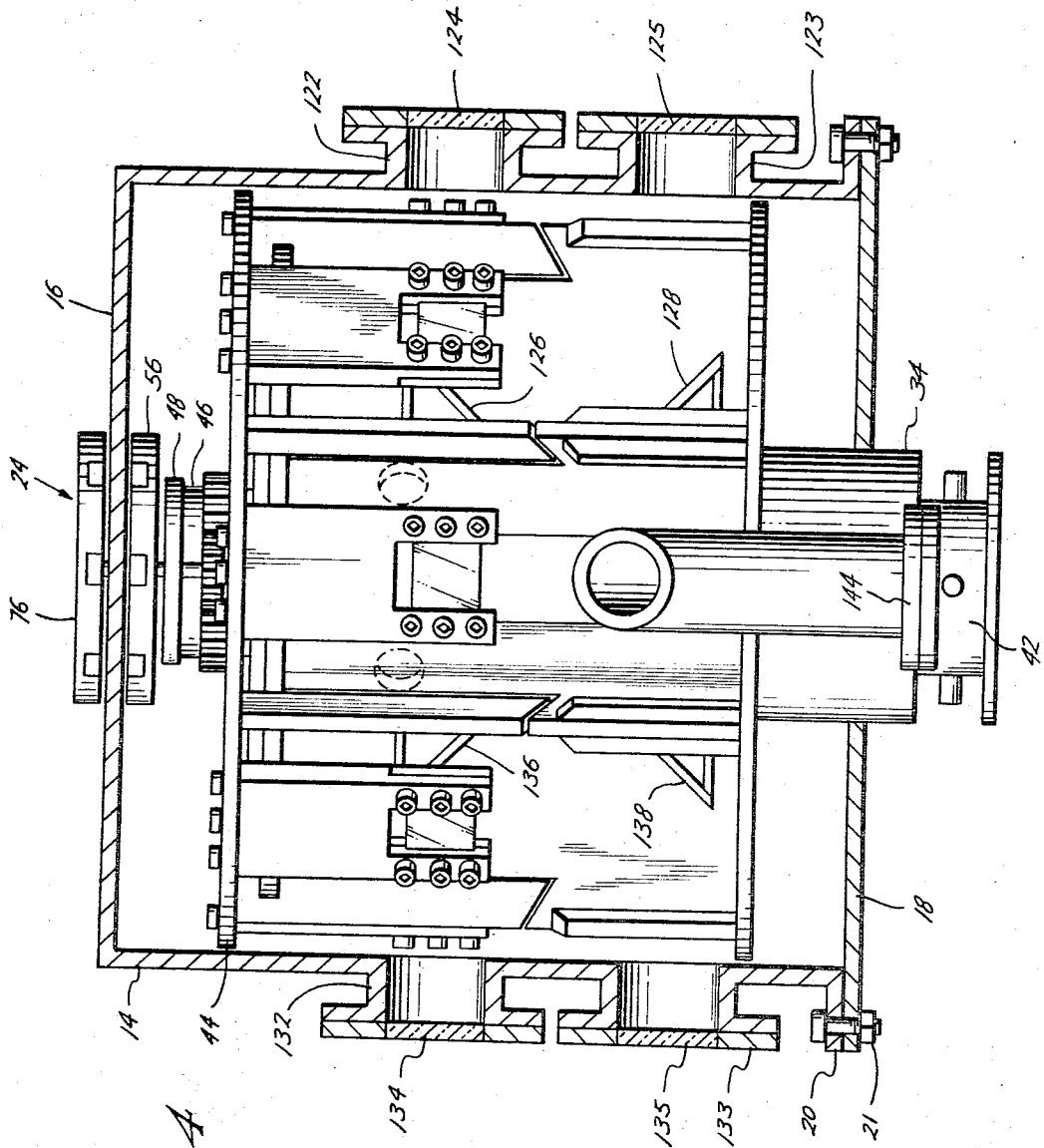

United States Patent Office 3,340,397
Patented Sept. 5, 1967

3,340,397
MULTIPLE ENVIRONMENT MATERIALS TEST CHAMBER HAVING A MULTIPLE PORT X-RAY TUBE FOR IRRADIATING A PLURALITY OF SAMPLES
Robert L. Johnston, Houston, Tex., assignor to the United States of America as represented by the Administrator of the National Aeronautics and Space Administration
Filed Dec. 9, 1964, Ser. No. 417,253
5 Claims. (Cl. 250—52)

ABSTRACT OF THE DISCLOSURE

The test chamber of the present invention utilizes a single source of X-rays at the center of the chamber housing having multiple outlets for exposing the materials to various environmental conditions. Testing and measuring equipment are mounted outside the chamber around the periphery thereof. The materials to be tested are mounted within the chamber at the periphery and means provided to rotate each of the materials to a position whereby numerous tests may be performed thereupon to measure the progressive changes in the materials. Due to the rotational features, a minimum of testing equipment is necessary, and this equipment may be permanently mounted around the periphery of the chamber so as to obviate the need for recalibration of the equipment.

---

The invention described herein may be manufactured and used by or for the Government of the United States of America for governmental purposes without the payment of any royalties thereon or therefor.

This invention relates in general to environmental test chambers and, more particularly, to a multi-sample test chamber for exposing materials to X-rays and other environmental conditions, and determining the effects of such conditions on the materials.

When testing materials which are subjected to various environments such as X-rays, temperature changes, and gaseous conditions for prolonged periods of time, the test chamber must be able to allow the testing to continue almost uninterrupted, while simultaneously allowing readings to be taken to determine the progressive changes which have evolved in materials. If the testing time required is very prolonged, up to a year or more, it is necessary to keep the costs of both the testing and the associated equipment to a minimum, yet allowing each of the materials to be subjected to the same environmental conditions such as X-ray strength and atmosphere. Hence, a single test chamber is needed which will allow the simulation of the environmental conditions while simultaneously allowing rapid and economical testing of the materials.

Heretofore it has been necessary, when testing a multiplicity of materials in a multi-sample chamber, to remove each of the materials from the chamber in order to test the materials for environmental changes. Such a procedure was not only time consuming, since it required the tests to be stopped, but removal of the materials causes errors to be introduced into the tests due to the removal of the material from both the holder and the chamber.

In order to overcome the attendant disadvantages of prior art testing chambers, the test chamber of the present invention utilizes a single source of X-rays at the center of the chamber housing having multiple outlets for exposing the materials to various environmental conditions. Testing and measuring equipment are mounted outside the chamber around the periphery thereof. The materials to be tested are mounted within the chamber at the periphery and means provided to rotate each of the materials to a position whereby numerous tests may be performed thereupon to measure the progressive changes in the materials. Due to the rotational feature, a minimum of testing equipment is necessary, and this equipment may be permanently mounted around the periphery of the chamber so as to obviate the need for recalibration of the equipment.

More particularly, the test chamber comprises an outer cylindrical member which is divided into compartments having material holders mounted therein. Each of the compartments comprises side walls which are fixedly mounted to a cylindrical inner member. Apertures are provided in the inner member for allowing an X-ray source mounted within the inner member to expose the materials in alternate compartments. The material holders are secured to an outer top plate which is formed integrally with a gear mechanism. The top of the chamber housing has attached thereto a driving member which permits rotation of the gear mechanism so as to allow each of the material holders to be rotated to different compartments. Output ports are provided around the circumference of the chamber for a spectrometer to analyze each of the materials and specimens with a minimum of adjustment of the equipment. Further, an inlet and an outlet port are provided to allow gas to enter and leave the chamber to determine any gaseous emissions, or to subject the materials to various gaseous environments and tests, while simultaneously measuring changes in the gaseous environment of the chamber. Also, deflection apparatus is provided which allows each of the materials to be deflected a known distance, and the force needed to produce such a deflection may be readily measured on a cathometer connected to another output port of the chamber. Thus the present invention allows a multiplicity of materials and specimens to be subjected to various environments and a minimum of equipment used to determine changes caused by such environmental conditions without removal of the samples from the chamber.

The advantage of this invention, both as to its construction and mode of operation, will be readily appreciated as the same become better understood by reference to the following detailed description when considered in connection with the accompanying drawings in which like reference numerals designate like parts throughout the figures, and wherein:

FIG. 1 is a perspective view of the materials test chamber in accordance with this invention;

FIG. 2 is a side view of the chamber of FIG. 1, partly in section;

FIG. 3 is a top view, partly in section, of the chamber of FIG. 2 taken along the line 3—3 of FIG. 2;

FIG. 4 is a side view of the chamber taken along the line 4—4 of FIG. 3; and

FIG. 5 is an exploded view of the sample holder employed in the chamber.

Referring now to the drawings, there is shown in FIG. 1 a test chamber 12 for subjecting materials to various environmental conditions in accordance with this invention.

The test chamber 12 comprises an outer cylindrical member 14 having attached thereto at one end a top housing wall 16, and at the other end a bottom housing wall 18 which is secured to a housing flange 20 by means of bolts 21. The test chamber further comprises a drive mechanism 24, which is magnetically coupled into the chamber so as to rotate the materials being tested, as will be explained hereinafter. A door 25, which may be secured by bolts to the member 14, allows entry and removal of the materials to be tested from the chamber. The test chamber is shown in greater detail in FIGS.

2-4 and comprises a plurality of compartments 26 having material holders 28 mounted therein. Each of the compartments comprises side walls 32 which are fixedly mounted to a cylindrical inner member 34. Each of the compartments further contains side walls 35, which form a continuation of the side wall 32, but are separated therefrom by a small air gap and, together with the manterial holders, are fastened to an outer top plate 36.

In alternate chambers there are provided apertures having beryllium windows 40 in the inner member 34 for allowing an X-ray source to expose the material mounted in the material holders 28 to a source of X-rays. A multi-port X-ray tube 42 is mounted within the inner member 34. For a test chamber having eight compartments, as is illustrated in the drawings but not limited thereto, a four port X-ray tube would be needed in order to expose alternate chambers containing materials to the source of X-rays.

Each of the chambers further comprises a top compartment wall 44 and a bottom compartment wall 45 which are both fixedly attached to the inner member 34 and to the side walls 32. A shaft member 46 is integrally formed with the wall 44 at one end thereof and a flat plate 48 at the opposite end thereof. The flat plate 48 has an opening 52 for allowing a drive shaft 54 to extend therethrough.

The drive shaft 54 has a plate member 56 attached at one end which contains radially mounted permanent magnets 58. The other end of the drive shaft has a driving gear 62 attached thereto which is intermeshed with a driven gear 64. The driven gear 64 forms a portion of the outer top plate 36. The outer top plate contains a plurality of bearing 68 and spring 72 arrangements which contact the shaft member 46, allowing the material holders 28 to be correctly positioned upon rotation due to indents 74 in the shaft member 46 into which the bearing members fall.

Rotation of the driving gear 62 occurs when an outer driving member 76 containing radially extending magnets 78 is turned on a shaft 82 which is mounted on the top housing wall 16 of the test chamber. Rotation of the drive member 76 and the associated magnets 78 causes the plate member 56 to turn, due to the magnetic effect of the magnets 78 on the magnets 58. The indents 74 are so positioned that each rotational movement of the member 76 will cause the material holder 28 to stop at the center of the next adjacent compartment 26.

The material holders 28 comprise a mounting member 84 which is secured by means of screws 86 to the outer top plate 36. The holder 28, shown in greater detail in FIG. 5, comprises a pair of projecting studs 87 which are made integral with the mounting member 84 and contain indents 88. A material to be tested 92 is inserted in the indents 88 and held in place by a pair of mounting brackets 94. The mounting brackets are then secured to the studs by means of bolts 96.

The materials test chamber further comprises heating and/or cooling coils 102 in each compartment which extend through the side wall 32. The coils have an inlet 104 and an outlet 106 which allow liquid to enter and exit. The coils allow a liquid to heat or cool each of the chambers to a desired temperature so that the material may be subjected to a desired temperature.

Ports are provided in the outer member 14 which allow measurements to be made to the material while the material is held in the holders 28. An inlet port 114 is provided for allowing gas to enter the chamber and subject the material to a known gaseous condition. An outlet port 116 is connected to the inlet port 114 which allows these gases to exhaust and be analyzed.

An inlet port 122 and outlet port 123 having windows 124, 125, respectively, made of quartz or Irtran, are attached to the outer member 14 opposite one of the compartments 26. Fixedly attached to the inner member 34 directly opposite the inlet port 122 is a 45° angle mirror 126, and fixedly attached to the inner member 34 directly opposite the outlet port 123 is a second 45° mirror 128. A spectrometer (not shown) may be fixedly attached to the inlet port 122 and outlet port 123. As can be readily seen, light beams from the spectrometer may be passed through the material in the compartment 26 and are exited after reflection in the mirrors 126 and 128 through the outlet port 123 to the output sensing means of the spectrometer. Simultaneously, an inlet port 132 and an outlet port 133, having windows 134, 135, respectively, are provided having 45° mirrors 136, 138 associated therewith. The ports 132 and 133 may also have attached thereto a spectrometer.

Also attached to the outer member opposite one of the compartments 26 is a solenoid compartment 142 for use with a cathometer. The solenoid allows the material in the compartment opposite the solenoid to be deflected a known distance with a given force upon energization. The material in the compartment 26 is deflected, and the distance of deflection measured so as to allow deterioration of the material to be measured. Measurements of deflection may be read on a cathometer mounted on an outlet port 144 having a quartz or Irtran window 145.

As can be readily seen, each of the materials in a compartment can be rotated by means of the drive mechanism 24 so that it is positioned opposite measuring equipment, such as the spectrometer or cathometer, and readings taken of the progress of the materials whereas the measuring instruments need not be moved. Of course, as can be readily seen, should the materials exposed to X-rays be rotated to a compartment having no outlet port for X-rays, the adjacent material is simultaneously moved to a compartment which will allow the material to be subject to X-rays. If it is desired not to have the adjacent material exposed to X-rays, the X-ray source must be turned off. It is equally apparent to those skilled in the art that means could be provided so as to block X-rays from striking alternate positioned materials so that when they are rotated to a chamber having the source of X-rays communicate with that respective compartment the X-rays will be blocked from that material.

Thus, as can be readily seen, the device of the subject invention allows a plurality of chambers to be subjected to various environments and a multiplicity of tests performed on these materials without having the instruments to perform the tests moved to the respective compartments, but the materials themselves may be positioned so that the tests may be performed. Further, the apparatus allows the materials to be positioned whereby measurements may be made thereon without removal of the material from the chamber or holders. Thus, prolonged tests, such as a year or longer, may be performed on such materials without confusion as to position of each of the materials, and allowing a rapid testing to be performed so as to minimize the shutdown time of the equipment and allowing the test to continue as rapidly as possible.

The drive mechanism 24 has been illustrated to utilize a magnetic drive to rotate the materials in the chamber and position them so that tests may be performed on each of the materials. This drive mechanism is merely illustrative of one embodiment of how the materials may be moved. The mechanism allows rotation without any internal communication with the chamber so as to prevent leakage out of the chamber. It should be understood, however, that other drive mechanisms could be used without departing from the scope of this invention.

Further, other outlet ports for performing other tests could also be utilized in the chamber, and the test ports communicating with four compartments are merely illustrative of the type of test which could be performed and should not be considered as limiting. Additional ports for testing may also be provided, although size of the chamber, of course, is always a limiting factor. Further, as has been previously mentioned, while a four port X-ray tube has been illustrated, greater or lesser multi-port tubes could be utilized to expose other materials to the X-ray source.

It should be further understood that the foregoing disclosure relates only to preferred embodiments of the invention, and that it is intended to cover all changes and modifications of the examples of the invention herein chosen for the purpose of the disclosure which do not constitute departures from the spirit and scope of the invention.

What is claimed and desired to be secured by Letters Patent is:

1. A multiple environment materials test chamber for subjecting materials to various environments comprising:
   a chamber housing comprising an outer cylindrical member having a top housing wall at one end of said outer cylindrical member, and a bottom housing wall at the other end of said outer cylindrical member;
   means housing a multiple port X-ray tube at the center of said chamber for exposing materials to X-rays, comprising a cylindrical inner member mounted coaxially within said chamber housing, said inner member being secured to said bottom housing wall;
   a top compartment wall and a bottom compartment wall, each mounted in said housing in a plane parallel to said housing walls and each being secured to said inner member said top compartment wall having an area smaller than said top housing wall;
   means dividing said chamber into a plurality of compartments, comprising side walls extending from said inner member toward said outer cylindrical member, said side walls being secured at one end to said top compartment wall and at the other end to said bottom compartment wall;
   means in said inner member for allowing said X-rays to penetrate into said compartments each of the ports of said multiple port X-ray tube being operatively associated with one of said compartments, respectively;
   a shaft member extending from said top compartment wall toward said top housing wall;
   a top plate mounted in a plane parallel to said top compartment wall and rotatably engaging said shaft member the outer edge of said top plate defining an area greater than said top compartment wall area but less than said top housing wall area;
   a plurality of material holders mounted on that portion of said top plate which extends beyond the area of said top compartment wall, said material holders protruding into each of said compartments;
   means for rotating said top plate so as to position each of said material holders in a desired compartment comprising:
      a driving mechanism mounted on said top housing wall;
      a driving gear coupled to said driving mechanism; and
      a driven gear integral with said top plate for mating with said driving gear;
   means in each of said compartments for circulating a fluid therein for varying the temperature of each of said compartments; and
   means coupled to said outer cylindrical member for allowing the testing of said materials without removing the materials from said chamber.

2. A multiple environment materials test chamber for subjecting materials to various environments comprising:
   a chamber housing comprising an outer cylindrical member having a top housing wall at one end of said outer cylindrical member, and a bottom housing wall at the other end of said cylindrical member;
   means for housing a multiple port X-ray tube at the center of said chamber for exposing materials to X-rays comprising a cylindrical inner member mounted within said housing, one end of said inner cylindrical member being secured to said bottom housing wall;
   a top compartment wall secured to the other end of said inner member, and a bottom compartment wall secured to said inner member, said top compartment wall and bottom compartment wall being mounted in said chamber housing in a plane parallel to said housing walls and parallel to each other, said top compartment wall having an area smaller than said top housing wall;
   means dividing said chamber into a plurality of compartments comprising side walls extending from said inner member toward said outer cylindrical member, said side walls being secured at one end to said top compartment wall and at the other end to said bottom compartment wall;
   means in said inner member for allowing said X-rays to penetrate into said compartments each of the ports of said multiple port X-ray tube being operatively associated with one of said compartments, respectively;
   a shaft member extending from said top compartment wall toward said top housing wall;
   a top plate mounted in a plane parallel to said top compartment wall and rotatably engaging said shaft member the outer edge of said top plate defining an area greater than said top compartment wall area but less than said top housing wall area;
   a plurality of material holders mounted on that portion of said top plate which extends beyond the area of said top compartment wall, said material holders protruding into each of said compartments; and
   means for rotating said top plate so as to position each of said material holders in a desired compartment comprising:
      a driving mechanism mounted on said top housing wall;
      a driving gear coupled to said driving mechanism; and
      a driven gear integral with said top plate for mating with said driving gear.

3. A multiple environment materials test chamber for subjecting materials to various environments comprising:
   a chamber housing comprising an outer cylindrical member having a top housing wall at one end of said outer member, and a bottom housing wall at the other end of said outer member;
   means for housing a multiple port X-ray tube at the center of said chamber for exposing materials to X-rays comprising a cylindrical inner member mounted within said chamber housing, one end of said inner cylindrical member being secured to said bottom housing wall;
   a top compartment wall secured to the other end of said inner member, and a bottom compartment wall secured to said inner member, said top compartment wall and bottom compartment wall being mounted in said chamber housing in a plane parallel to said housing walls and parallel to each other, said top compartment wall having an area smaller than said top housing wall;
   means dividing said chamber into a plurality of compartments comprising side walls extending from said inner member toward said outer cylindrical member, said side walls being secured at one end to said top compartment wall and at the other end to said bottom compartment wall;
   means in said inner end wall for allowing said X-rays to penetrate into said compartments each of the ports of said multiple port X-ray tube being operatively associated with one of said compartments, respectively;
   a shaft member extending from said top compartment wall toward said top housing wall;
   a top plate mounted in a plane parallel to said top compartment wall and rotatably engaging said shaft member the outer edge of said top plate defining an area greater than said top compartment wall area but less than said top housing wall area;

a plurality of material holders mounted on that portion of said top plate which extends beyond the area of said top compartment wall, said material holders protruding into each of said compartments; and means for rotating said top plate so as to position each of said material holders in a desired compartment.

4. A multiple environment materials test chamber for subjecting materials to various environments comprising:

a cylindrical housing member;

means for housing a multiple port X-ray tube at the center of said chamber for exposing materials to X-rays comprising an inner member mounted within said cylindrical housing member;

a top compartment wall and a bottom compartment wall, each being secured to said inner member;

means dividing said chamber into a plurality of compartments comprising side walls extending from said inner member toward said cylindrical housing member, said side walls being secured at one end to said top compartment wall and at the other end to said bottom compartment wall, said top compartment wall and bottom compartment wall being mounted in a plane perpendicular to said side walls;

means in said inner member for allowing said X-rays to penetrate into said compartments each of the ports of said multiple port X-ray tube being operatively associated with one of said compartments, respectively;

a shaft member extending from said top compartment wall;

a top plate mounted in a plane parallel to said top compartment wall and rotatably engaging said shaft member the outer edge of said top plate defining and area greater than said top compartment wall area;

a plurality of material holders mounted on that portion of said top plate which extends beyond the area of said top compartment wall, said material holders protruding into each of said compartments; and means for rotating said top plate so as to position each of said material holders in a desired compartment.

5. A multiple environment materials test chamber for subjecting materials to various environments comprising:

a housing member;

means for housing a multiple port X-ray tube at the center of said chamber for exposing materials to X-rays comprising an inner member mounted within said housing member;

means dividing said chamber into a plurality of compartments surrounding said inner member, said compartments comprising side walls extending from said inner member, said side walls being mounted in a plane parallel to the axis of said inner member toward said housing member;

means in said inner member for allowing said X-rays to penetrate into said compartment, each of the ports of said multiple port X-ray tube being operatively associated with one of said compartments respectively;

a plurality of material holders mounted on a rotatable plate and protruding into each of said compartments; and means for rotating said rotatable plate so as to position each of said material holders in a desired compartment.

References Cited

UNITED STATES PATENTS 2,885,557   5/1959   Kizaur _____ 250—52

RALPH G. NILSON, *Primary Examiner.*

A. L. BIRCH, *Assistant Examiner.*